Figure 1:
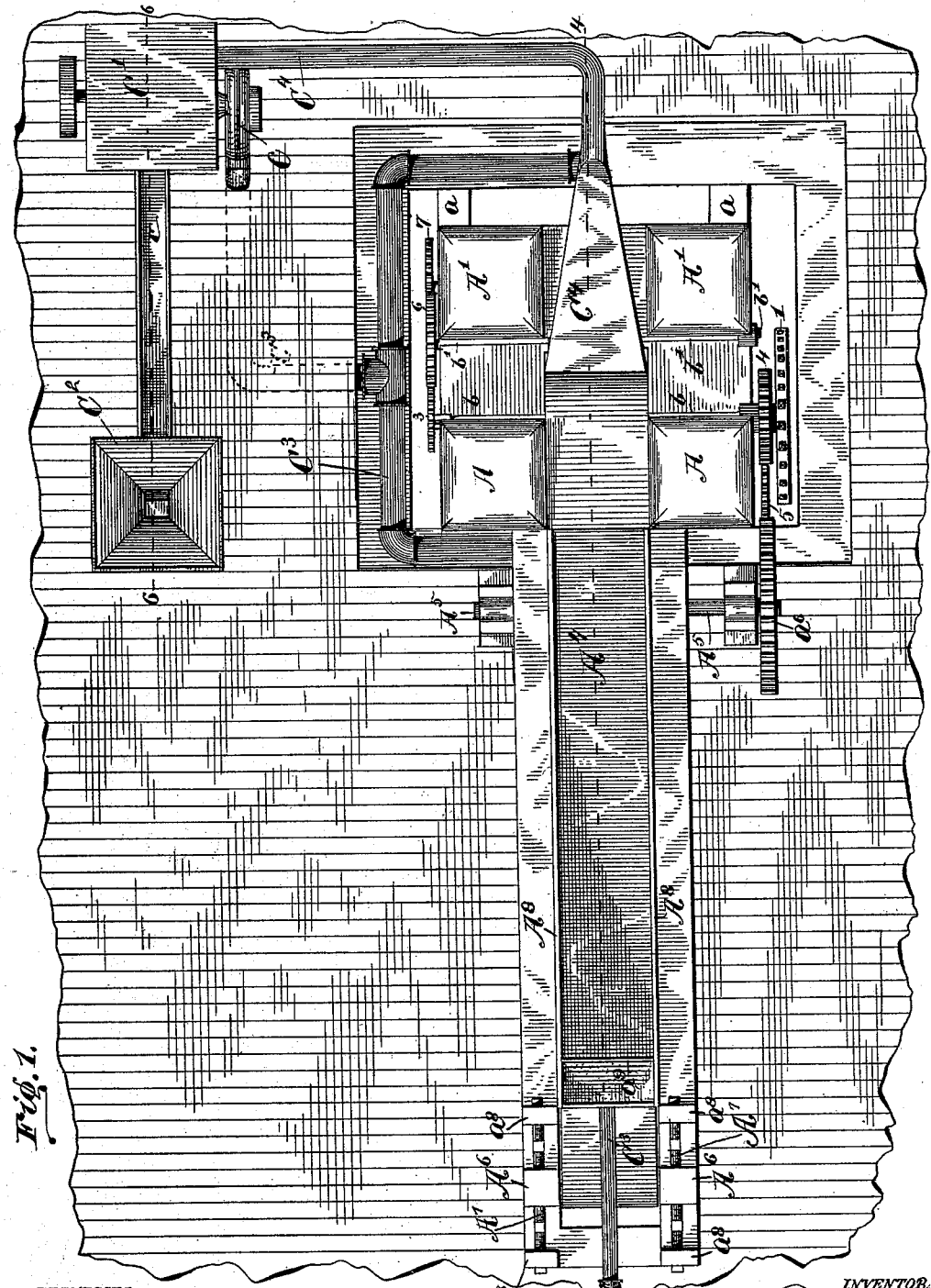

(No Model.) 5 Sheets—Sheet 1.

P. F. & A. F. BRYCE.
BREAD MAKING MACHINE.

No. 402,396. Patented Apr. 30, 1889.

WITNESSES.
C. W. H. Brown.
F. W. Wood.

INVENTOR.
Peter F. Bryce,
Alexander F. Bryce,
by E. W. Bradford,
ATTORNEYS.

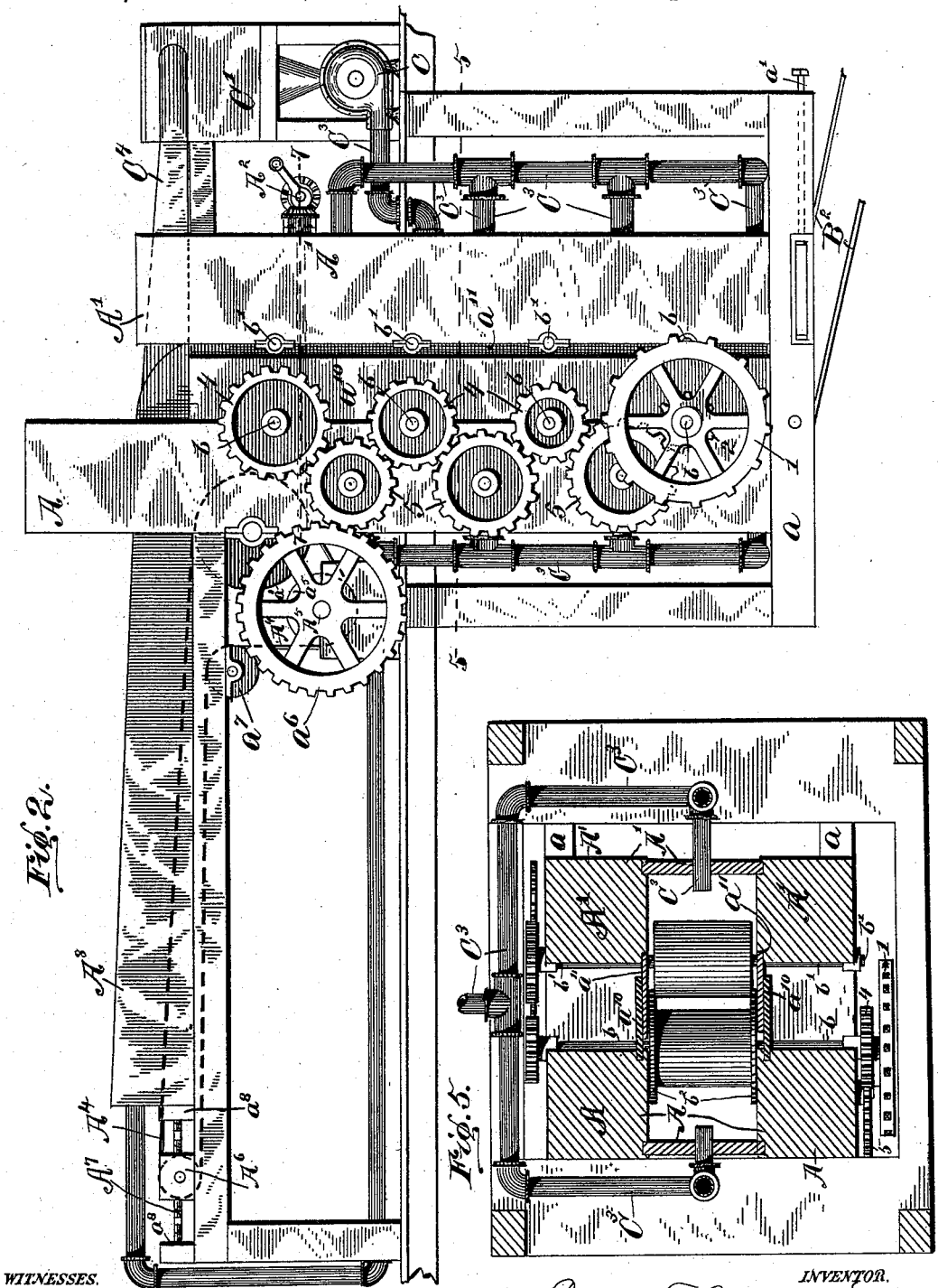

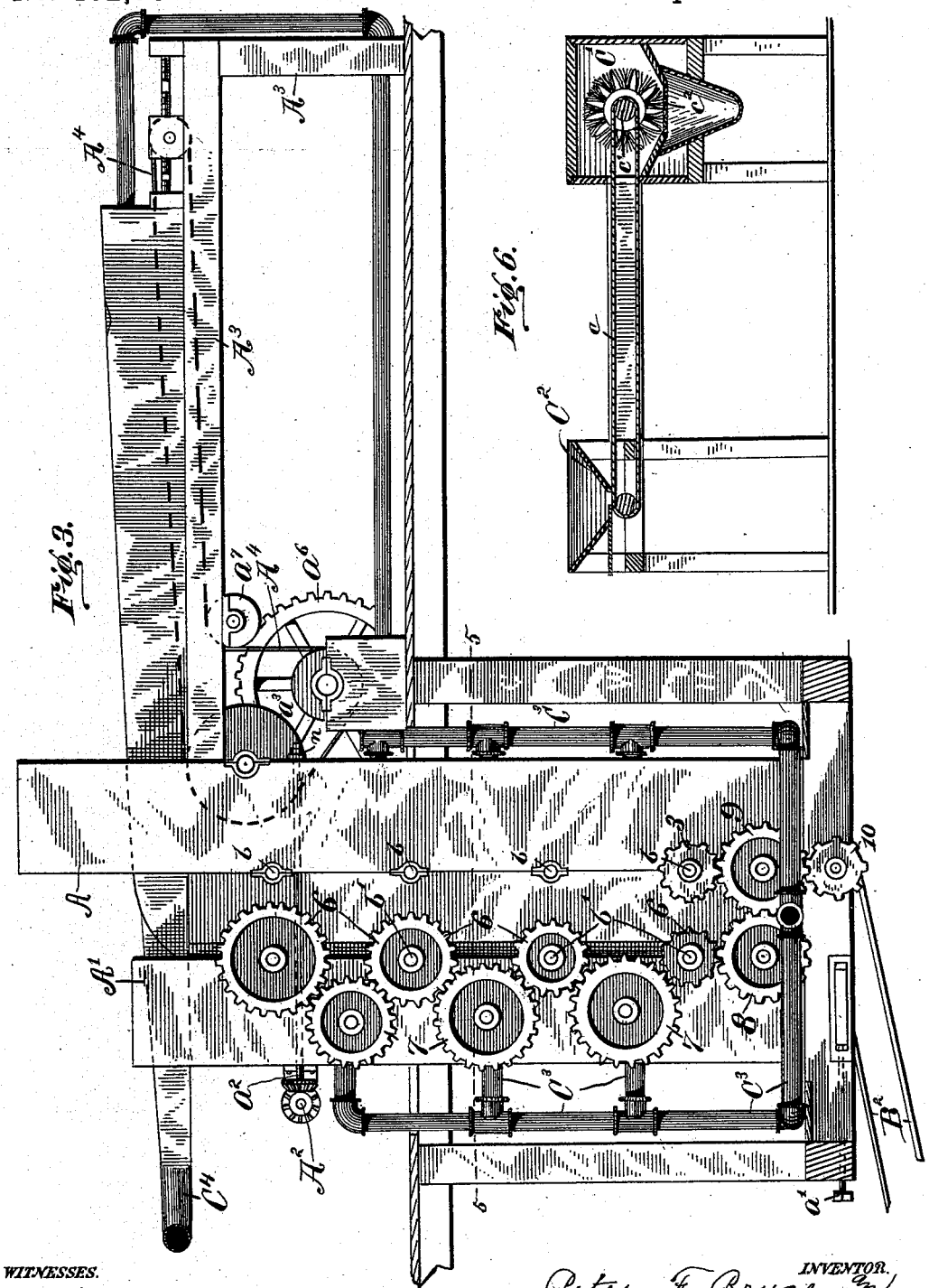

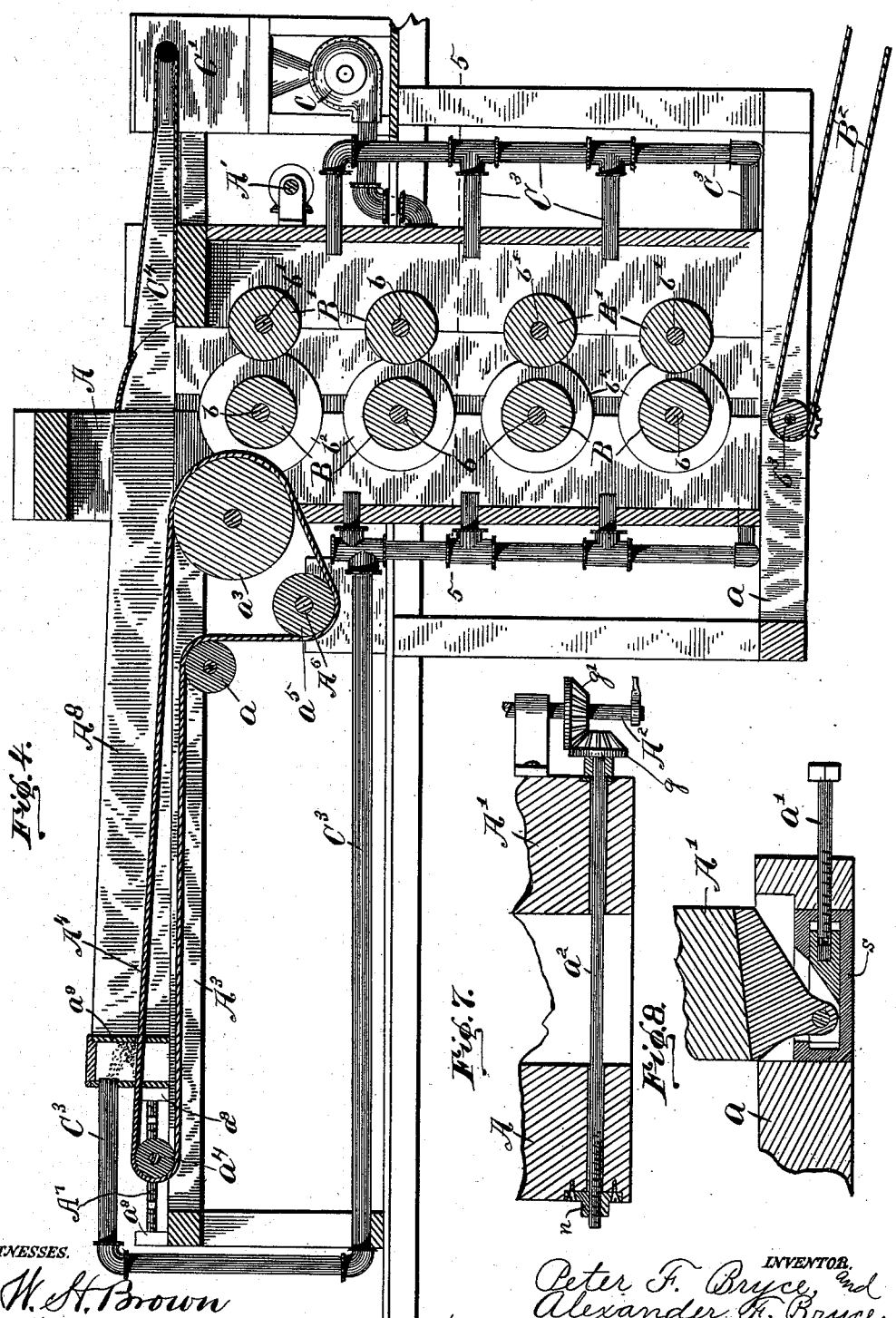

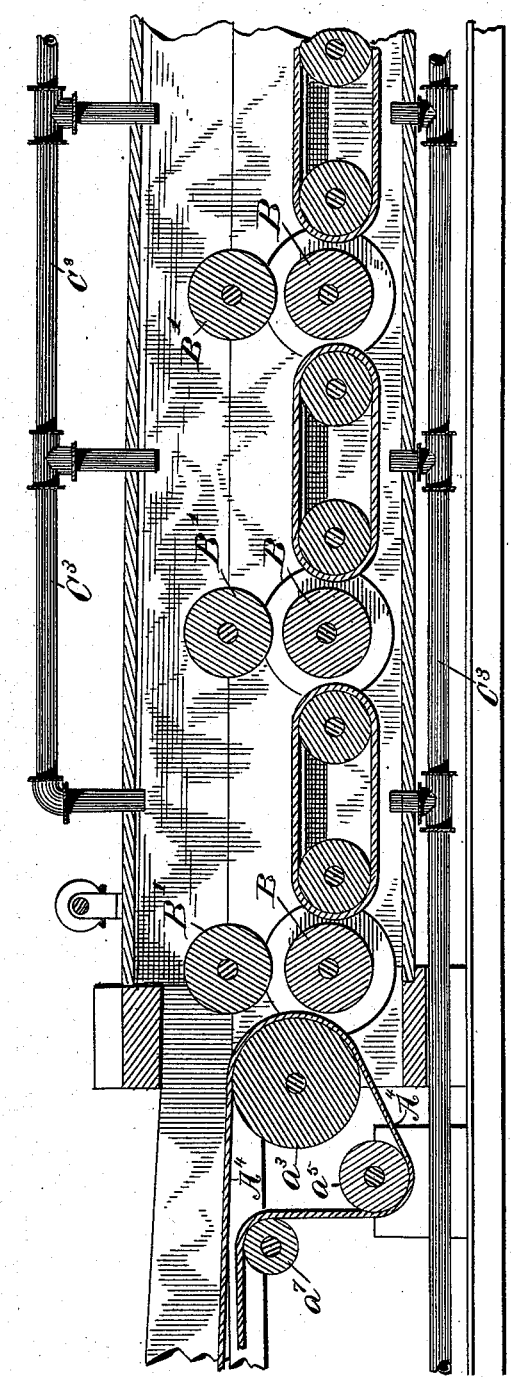

UNITED STATES PATENT OFFICE.

PETER F. BRYCE AND ALEXANDER F. BRYCE, OF INDIANAPOLIS, INDIANA.

BREAD-MAKING MACHINE.

SPECIFICATION forming part of Letters Patent No. 402,396, dated April 30, 1889.

Application filed November 24, 1888. Serial No. 291,734. (No model.)

*To all whom it may concern:*

Be it known that we, PETER F. BRYCE and ALEXANDER F. BRYCE, citizens of the United States, residing at Indianapolis, in the county of Marion and State of Indiana, have invented certain new and useful Improvements in Bread-Making Machines, of which the following is a specification.

The object of our said invention is to provide a machine for rolling out dough from the bulky mass in which it is first formed to a sheet of exactly the desired thickness and width from which the loaves can be cut preparatory to baking, by the use of which much labor is saved, loaves of a uniform size are formed, and a better character of bread manufactured, as will be hereinafter more fully described and claimed.

Referring to the accompanying drawings, which are made a part hereof, and on which similar letters of reference indicate similar parts, Figure 1 is a top or plan view of a machine embodying our said invention; Fig. 2, a side elevation of the same, looking to the left in Fig. 1; Fig. 3, a similar view looking to the right in Fig. 1; Fig. 4, a central vertical section on the dotted line 4 4 in Fig. 1; Fig. 5, a horizontal section on the dotted line 5 5 in Fig. 2; Fig. 6, a detail sectional view on the dotted line 6 6 in Fig. 1; Fig. 7, a detail section on the dotted line 7 7 in Fig. 2; Fig. 8, a detail vertical section through the lower end of one of the adjustable posts of the frame, and Fig. 9 a longitudinal section illustrating a modified construction.

In said drawings the portions marked A represent the frame of the machine, B B' the reducing-rolls, and C the blow-fan and dusting mechanism for blowing the flour-dust into the apparatus.

The frame A consists of two main posts set rigidly in sills $a$ the proper distance apart, and preferably extending partly above and partly below the floor on which the machine is mounted. The space between them is cased up at the rear side, and forwardly-projecting wings $a^{10}$ are secured to their front adjacent corners. Similar posts, A', are adjustably secured in said sills $a$ a short distance in front of the posts A, the space between the front corners of which is inclosed, and which have wings $a^{11}$ secured to their rear adjacent corners, which overlap or break joints with the forwardly-extended wings $a^{10}$, thus forming with the posts a vertical box or casing having an open top and bottom. Said posts A' are pivoted to shoes $s$, which are mounted in elongated slots in the sills $a$, and screw-threaded rods $a'$ are mounted in suitable bearings in said sills and engage with said shoes, (see Fig. 8,) by which said posts are adjusted to and secured in the desired position. Rods $a^2$, with screw-threaded inner ends, are also secured in the top of said posts A' in suitable bearings and extend in through enlarged holes to the rear side of the posts A to engage with nuts $n$, secured thereto, being provided on their outer ends with bevel gear-wheels $g$, which mesh with similar gear-wheels, $g'$, on the crank-shaft $A^2$, which is mounted in suitable bearings on the front side of said posts A' and extends transversely thereof. The sills $a$ may be secured in position in any suitable manner, but are shown as a part of a rectangular structure supported from the floor-beams above.

Above the floor and extending back from the posts A is arranged a table, $A^3$, of a height convenient for the workmen and a length suitable for the purpose of receiving and feeding the dough to the rolls. An endless apron, $A^4$, forms the top of said table, being mounted on the roller $a^3$ at the front end of said table and the roller $a^4$ at its rear end, and passing down around the roller $a^5$, which is mounted on the shaft $A^5$, journaled in suitable bearings beneath the front end of said table and driven by a gear-wheel, $a^6$, on one end thereof, arranged to mesh with the roll-driving gearing, as will be presently described. Said apron also passes over an idler-roll, $a^7$, which is preferably mounted on the under side of the table nearly above the roller $a^5$ and operates to hold said apron up against said roller $a^5$ and secure the requisite amount of friction to drive it. The bearings $A^6$, in which the roller $a^4$ is journaled, are preferably mounted on screw-threaded rods $A^7$, which are journaled in suitable bearings, $a^8$, on the sides of the table-frame, as shown, and the adjustment of this roll for the purpose of tightening the apron thus provided for. Side boards, $A^8$, are provided on the top of said table, arranged substantially that distance apart which it is desired shall be the width of the sheet of dough when rolled. The top of the table is thus formed into a long narrow spout arranged to discharge into the rollers, the bottom of which is the endless apron.

The rolls B and B' are arranged in pairs, the shafts $b$ of the rolls B being journaled in bearings secured on the front side of the posts A, substantially equidistant one from the other, and the shafts $b'$ of the rolls B' in bearings on the rear side of the posts A' directly opposite said rolls B. Said rolls differ in construction only in that the rolls B are of slightly greater length than those B' and have wide annular flanges $b^2$ extending out from their ends, between which said rolls B' extend and operate, thus affording straight side walls to the opening between each pair of rolls, which prevent the dough from spreading out and insure that the edges of the sheet shall be square and straight. The lower shaft $b$ extends out through its bearings and the frame and has a sprocket-wheel, 1, (or any other suitable gear-wheel,) mounted on one end, which is geared to any convenient power. (Not shown.) A smaller gear-wheel, 2, is mounted alongside said sprocket-wheel, and a similar gear-wheel, 3, on the other end of said shaft. The shafts of the rolls B above said lower one extend out through the frame at one end only, and are each provided with a gear-wheel, 4, all of which are geared to and driven from the gear-wheel 2 on the lower shaft by means of the intermediate gear-wheels 5, which are journaled on stud-shafts on the side of the frame in position to make a continuous train of gearing from the lower roll to the top, said intermediate wheels also serving to maintain the same direction to all the rolls. The top gear-wheel 5 also meshes with the gear-wheel $a^6$, and thus transmits motion to the feeding-apron.

The shafts $b'$ of the rolls B' extend out, preferably, on the opposite side of the machine, and are each provided with a gear-wheel, 6, corresponding in size to the wheels 2 and 4, the size of each set of wheels being increased from the bottom to the top for the purpose of decreasing the speed, as will be presently described. Said gear-wheels 6 are connected by intermediate gear-wheels 7, as are the gear-wheels of the rolls B by the intermediate gear-wheels 5 on the opposite side of the machine. The lower wheel 6 is driven from the wheel 3 on the lower shaft $b$, to which it is geared by the gear-wheels 8 and 9, as shown. A carrier-apron, B², is arranged beneath the machine in position to receive the sheet of dough as it comes from the lower rolls, it being mounted on a roll, $b^3$, having a gear-wheel, 10, on the end of its shaft, which meshes with the gear-wheel 9, from which it receives its motion. Said apron runs to the place where it is desired to carry the sheet of dough, being supported at that end by a suitable roll, as will be readily understood.

The blow-fan C is in itself of an ordinary construction. It is connected with a casing, C', which in turn is connected to a hopper, C², which is filled with flour. Said hopper is connected to the casing C' by a conveyer-belt, $c$, which is mounted on a roller under said hopper, and a roller, $c'$, journaled in said casing and provided with a gear-wheel on the outer end of its shaft, by which it may be driven. A sieve, $c^2$, is also arranged horizontally in said casing, and brushes are secured in each end of the roller $c'$ on each side of the conveyer-belt, which operate to beat the flour through said sieve, and from thence it is drawn into the fan-casing and blown into a system of pipes, C³, which, by means of numerous branches, lead into each side of the machine above each set of rolls and into the rear end of the spout $A^8$, and thus all the parts of the machine which are brought into contact with the dough are kept thoroughly dusted and said dough prevented from adhering to said parts. A cross-partition, $a^9$, is preferably provided in the spout $A^8$ just in front of where the branch pipe C³ enters, and the flour is thus stopped and precipitated upon the feeding-apron, this end of said spout being covered, as shown. The air for the fan C is taken from just above the discharge end of said spout through the pipe C⁴, and thus any surplus flour coming up from the machine or off the apron $A^4$ is drawn in with the air and used over again and kept from mingling with the air outside.

The operation of our said invention is as follows: The rolls B and B' are first adjusted to the desired relative position, the space between the rolls constituting the lower pair being usually about one-half as wide as the space between the rolls next above, one-third as wide as the next space, and one-fourth as wide as the top space; but of course this adjustment may be varied to suit the particular work to be done. The gearing of the rolls is also graded to correspond, the speed of the top pair being (approximately) only one-fourth that of the bottom pair. The blow-fan and roll-driving mechanism are then set in motion, and a supply of dough is deposited upon the feeding-apron $A^4$, which has first been dusted with flour, as described, and fed forward between the top pair of rolls, its thickness being regulated by a workman standing at the table. The first pair of rolls operate to reduce the thickness of the sheet and form its edges square by means of the flanges $b^2$. As the sheet becomes reduced in thickness it increases in length, as will be readily understood, and the necessity for the increasing rate of speed of the rolls from top to bottom is therefore seen, said increase being in a ratio corresponding to the decrease in the width of the space between the rolls of the successive pairs, and thus the dough is rolled and pressed together without being stretched or drawn apart, and the same surface of the sheet is presented to the operation of the rolls at all times and the best possible results thus attained. As the sheet passes from the lower rolls out of the machine it is caught by the carrier-apron B² and is carried to a convenient table, where it is cut up into loaves and taken away.

While we have shown this machine with the rolls arranged one above the other and its operation from top to bottom, it will be readily seen that they may be arranged in a horizontal plane or at any angle, with short carrier-belts to convey the sheet from one set of rolls to the next, if necessary. Such a construction is shown in Fig. 9 and would be desirable for use in a building of only one floor, or where, for any reason, it is desired that the machine shall all be upon one floor. The differential speed and arrangement of rolls in relation to each other would of course be the same as in the preferable construction described.

Having thus fully described our said invention, what we claim as new, and desire to secure by Letters Patent, is—

1. The combination, in a bread-making machine, of the two-part frame, one part of which is adjustable toward and from the other, a series of rolls arranged in pairs, one roll of each pair being mounted on said adjustable portion of the frame, and the gearing for operating said rolls, substantially as set forth.

2. In a bread-making machine, the combination of the frame consisting of the rigid portion A, the adjustable portion A', and the table portion A³, a series of rolls arranged in pairs, one roll of each pair being mounted on the rigid portion A and the other on the adjustable portion A' of the frame, an endless feeding-apron mounted on said table portion, and the gearing for operating said several parts, substantially as set forth.

3. The combination, in a bread-making machine, of the frame, the rolls for reducing the dough, and an apparatus for dusting said rolls, consisting of a blow-fan connected with a flour-supply, and pipes connecting said blow-fan with the casing in which said rolls are mounted, and the operating mechanism, substantially as set forth.

4. The combination, in a machine for rolling out dough, of the frame, the reducing-rolls, the feeding-apron, the hopper C², casing C', a conveyer connecting said hopper and said casing, a blow-fan, and a pipe running from said casing to the casing containing said reducing-rolls, and the gearing for driving said several operating parts, substantially as set forth.

5. In a machine for rolling out dough, the combination of the reducing-rolls, the feeding-apron, the blow-fan, the flour-supply connected with said blow-fan, the system of pipes connected with said blow-fan and arranged to discharge onto said rolls and feeding-apron, and the air-supply pipe for said blow-fan, arranged with its mouth just above said rolls and the discharge end of said feeding-apron, substantially as described, and for the purpose specified.

6. The combination, in a bread-making machine, of a frame consisting of a rigid portion carrying one of each of the pair of rolls, an adjustable portion carrying the other rolls, and the screw-threaded rods $a^2$, by which the movement of said adjustable portion is effected, substantially as set forth.

7. The combination of the rigid frame portion A, the adjustable portion A', sills $a$, carrying sliding parts or shoes to which said adjustable portion is hinged, screws for adjusting said sliding shoes, the screw-threaded rods at the top extending from said portion A' to said portion A for securing and adjusting the top of said portion A', the pairs of rolls, one of each pair being journaled on the portion A and the other on the portion A', and the gearing for driving said rolls, substantially as set forth.

8. In a machine for rolling dough, the combination of the frame, the series of rolls arranged with the space between the rolls of each pair narrowing from the top to the bottom of the machine, gear-wheels on the ends of the journals of each roll of an increasing size from the bottom to the top, and intermediate gear-wheels connecting the gear-wheels of the rolls on each side, all arranged and operating substantially as set forth.

In witness whereof we have hereunto set our hands and seals, at Indianapolis, Indiana, this 19th day of November, A. D. 1888.

PETER F. BRYCE. [L. S.]
ALEXANDER F. BRYCE. [L. S.]

Witnesses:
E. W. BRADFORD,
C. W. H. BROWN.